United States Patent [19]
Yamaguchi et al.

[11] 4,267,853
[45] May 19, 1981

[54] SELF-CLOSING GAS PIPES AND PIPE JOINTS

[75] Inventors: Yukio Yamaguchi, Seto; Kenji Ishihara, Nagoya; Kikuo Yonekura, Higashibayashi, all of Japan

[73] Assignees: Toho Gasu Kabushiki Daisha, Nagoya; Kabushiki Kaisha Togawa Gomu Seizosho, Osaka, both of Japan

[21] Appl. No.: 877,566

[22] Filed: Feb. 13, 1978

[51] Int. Cl.³ .................. F16K 17/38; C01B 31/04
[52] U.S. Cl. .......................... 137/67; 73/363; 137/79; 251/4; 260/42.34; 423/448; 521/82
[58] Field of Search .............. 137/67, 457; 521/31, 521/77; 260/42.34; 169/48, 56; 423/448, 460; 251/4

[56] References Cited
U.S. PATENT DOCUMENTS

| | | | |
|---|---|---|---|
| 3,156,263 | 11/1964 | Adelman | 251/4 X |
| 3,431,970 | 3/1969 | Olstowski et al. | 423/448 X |
| 3,542,746 | 11/1970 | Eckardt et al. | 526/31 |
| 3,904,111 | 9/1975 | Petersson | 137/67 |
| 4,072,159 | 2/1978 | Kurosawa | 137/67 |

Primary Examiner—Martin P. Schwadron
Assistant Examiner—Richard Gerard
Attorney, Agent, or Firm—Dennison, Meserole, Pollack & Scheiner

[57] ABSTRACT

A gas pipe including a tube of expansible material defining a passage for gas and capable of expansion, when heated, to close the passage upon carbonization. The tube is surrounded by a cylindrical noninflammable member.

A joint for connecting gas pipes which includes a tube of expansible material contained in a metallic tubular member and defining a passage for gas. The tube is capable of expansion, when heated, to close the passage upon carbonization.

A method of manufacturing thermally expansible rubber tube for the gas pipe and the gas pipe joint. About 2 to 30 parts by weight of oxidized, thermally expansible graphite powder is mixed with 100 parts by weight of raw rubber, and a predetermined quantity of a curing agent and a cure accelerator are added to the rubber and graphite mixture, followed by its formation into a tubular shape.

4 Claims, 12 Drawing Figures

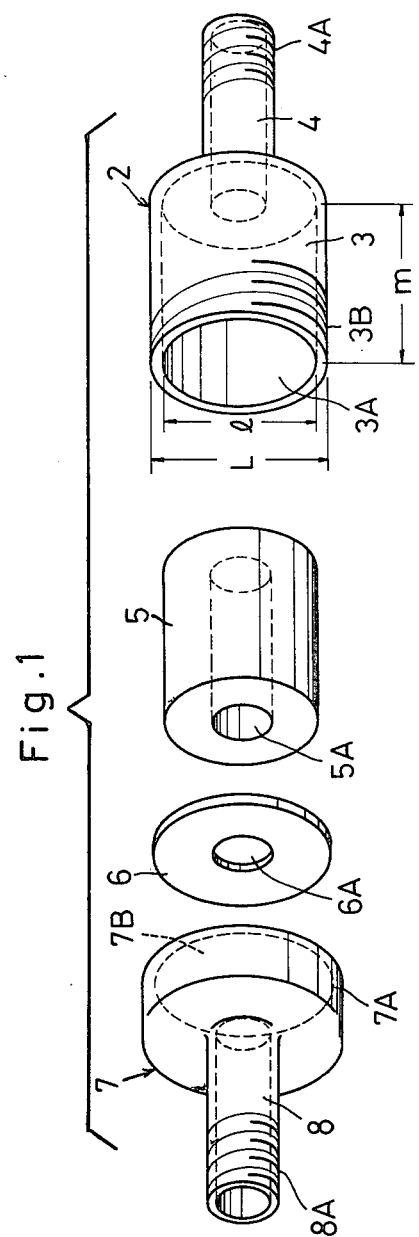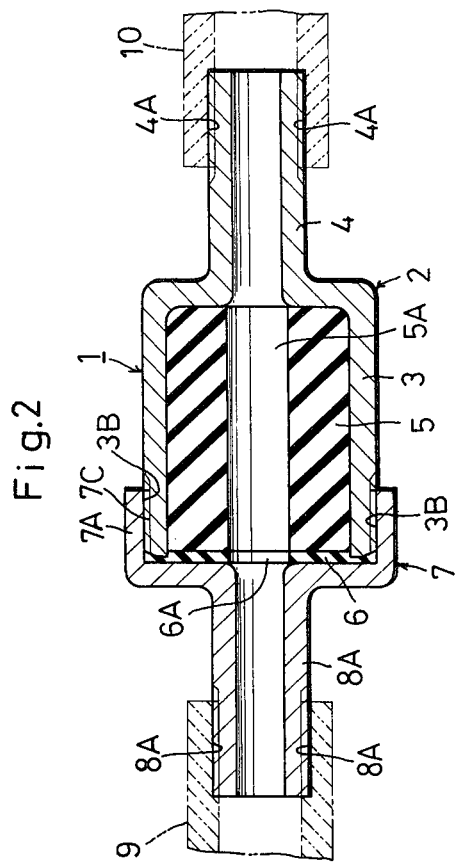

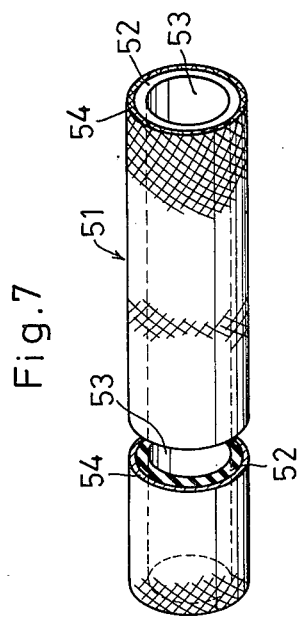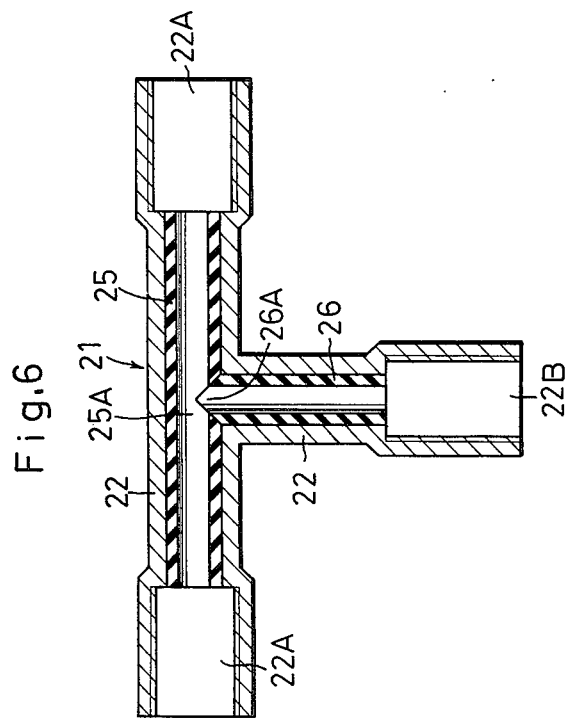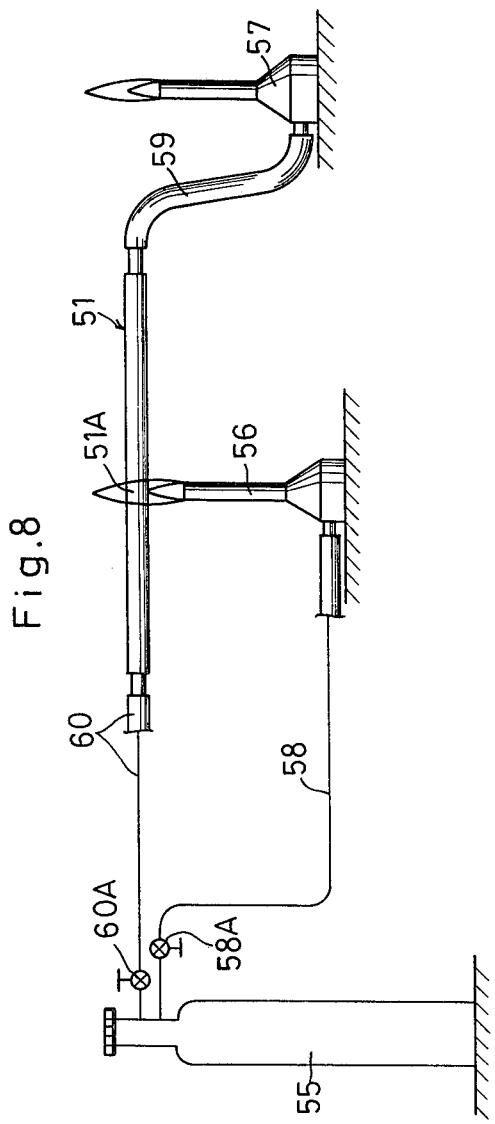

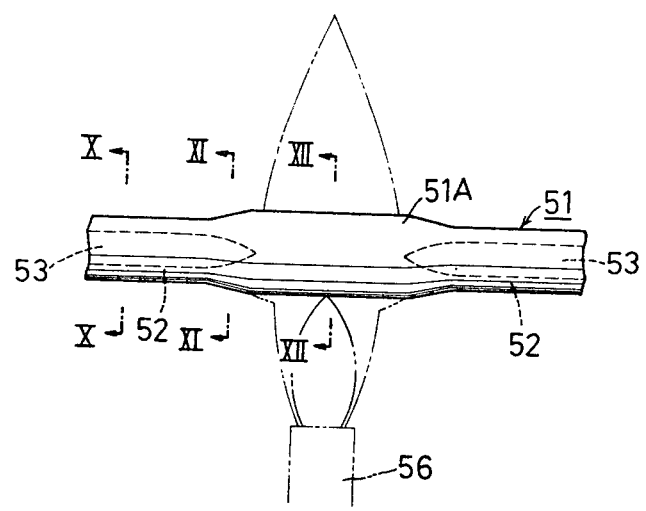
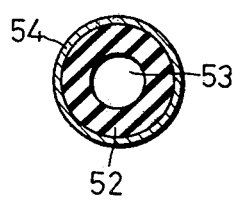 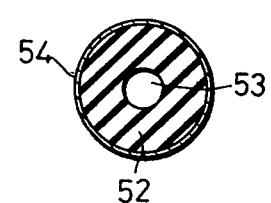 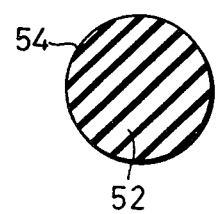

SELF-CLOSING GAS PIPES AND PIPE JOINTS

This invention relates to self-closing joints for connecting gas pipes. By the term "self-closing" as herein used, it is meant that the pipe joint of this invention includes a portion which expands, when heated, to close the axial passage of the joint. This invention also relates to gas pipes of the self-closing nature. This invention is also concerned with a method of making a tubular product of rubber which is expansible when heated and which is used for making the gas pipe and gas pipe joint of this invention.

An ordinary rubber tube connecting a gas cock and a gas oven, for instance, melts or burns when heated beyond a certain temperature. The tube is broken causing gas escape. This often causes a disastrous fire, particularly in a densely populated area or in a tall building. It has, therefore, been desired to provide a gas pipe of rubber covered with heat resistant or virtually noninflammable material and capable of thermal expansion to close its axial passage to prevent escape of gas without being damaged by heat in the event, for example, a fire breaks out in the vicinity of the pipe.

It has also been desired to provide an automatically closing means for discontinuing flow of gas in a service pipe from a gas main in case of a fire.

After making extensive research to find a solution to the aforementioned problems, the inventors of this invention have succeeded in producing a gas pipe and a gas pipe joint which expands when heated to automatically close their axial passages and shut off the flow of gas therethrough. They have ascertained that such a gas pipe and a gas pipe joint fully satisfy the various requirements for a practically acceptable means for conveying gas.

It is an object of this invention to provide a joint for connecting gas pipes which automatically closes itself upon expansion by heat.

It is another object of this invention to provide a gas pipe which automatically closes itself upon expansion by heat.

It is still another object of this invention to provide self-closing gas pipes and self-closing joints for connecting gas pipes which are easy to manufacture.

It is a further object of this invention to provide a method of making a tubular rubber product suited for the manufacture of self-closing gas pipes and self-closing joints for connecting gas pipes.

According to this invention, there is provided a joint for connecting gas pipes, comprising a metallic tubular member and a tubular closing member fitted within the metallic member and formed from a material which is capable of expansion, carbonization and solidification when heated to thereby close passage of gas. The gas pipe of this invention comprises a tubular member formed from a material which is capable of expansion, carbonization and solidification when heated to thereby close passage of gas, the tubular member being surrounded by noninflammable material, such as glass fiber.

The thermally expansible material suited for the manufacture of the gas pipe and pipe joint of this invention includes a rubber containing thermally expansible graphite, a rubber containing virtually noninflammable material, such as a halide and a phosphorous compound, and chlorosulfonated polyethylene containing a halide. All of these sorts of material are capable of expansion when heated to a temperature of about 180° C. to 260° C. The rubber containing thermally expansible graphite is most preferable, since it shows expansion of about 10 to 500 times, particularly about 100 to 500 times.

The tubular rubber product containing thermally expansible graphite may be easily made by a method comprising the steps of oxidize graphite powder by contacting it with fuming nitric acid or the like to impart thermal expansibility to the graphite powder, mixing about 2 to 30 parts by weight of the oxidized graphite powder with 100 parts of raw rubber to produce a rubber and graphite mixture, adding a predetermined quantity of a curing agent and a cure accelerator to the rubber and graphite mixture to produce a cured rubber mixture and forming the cured mixture into a tubular shape.

By virtue of their self-closing nature upon expansion, an appropriate use of the gas pipe and the joint for connecting gas pipes according to this invention is very useful in the prevention of a disastrous fire or explosion which would otherwise occur from escape of gas from a damaged gas line. The gas pipe joint of this invention is so simple in construction that it is very easy to manufacture in any desired size and shape.

The foregoing and other objects, novel features and advantages of this invention will become apparent from the following detailed description and the accompanying drawings, in which:

FIG. 1 is an exploded perspective view of the self-closing gas pipe joint embodying this invention;

FIG. 2 is a longitudinal sectional view of the joint shown in FIG. 1;

FIG. 6 is a longitudinal sectional view of a further modified gas pipe joint of the T-shaped construction according to this invention;

FIG. 7 is a perspective view of the self-closing gas pipe embodying this invention, partly broken away to show its transverse cross-section;

FIG. 8 is a diagrammatic view showing the apparatus used for testing the effectiveness of the gas pipe shown in FIG. 7;

FIG. 9 is a fragmentary enlarged view of FIG. 8 showing the gas pipe expanded by heat;

FIG. 10 is a cross-sectional view taken along line X—X of FIG. 9;

FIG. 11 is a cross-sectional view taken along line XI—XI of FIG. 9; and

FIG. 12 is a cross-sectional view taken along line XII—XII of FIG. 9.

Figure 3:
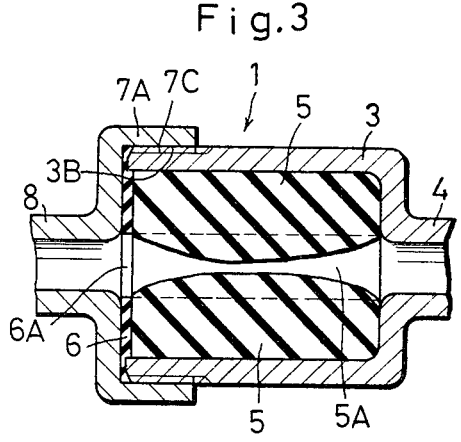
FIG. 3 is a fragmentary view similar to FIG. 2 showing the closing member of the joint in its partly expanded position.

Referring to FIGS. 1 to 4 of the drawings, the gas pipe joint of this invention is, by way of example, shown at 1 and comprises a metallic tubular member 2, a closing member 5 of rubbery material fitted within the metallic tubular member 2, a metallic cover 7 placed over the metallic tubular member 2 and a sealing member 6 interposed between the metallic tubular member or body 2 and the cover 7.

The tubular body 2 is formed by two tubular portions of different diameter as best shown in FIG. 2. They may be called a large diameter portion 3 and a small diameter portion 4 coaxially extending from one end of the large diameter portion 3 to serve as a pipe connector at its free open end. The other or free end 3A of the large diameter portion 3 is totally open and externally threaded at 3B. The closing member 5 comprises a cylinder of heavy wall thickness formed therethrough with an axial passage 5A for gas. The closing member 5 has an outside diameter which is substantially equal to the inside diameter l of the large diameter portion 3, and an axial length which is substantially equal to the depth m of the large diameter portion 3. The closing member 5 is formed from rubbery material of the sort which is capable of expansion, carbonization and solidification when heated. Preferred examples of such rubbery material include butadiene rubber containing 20% by weight of fine powder of thermally expansible graphite having a grain size of 200 mesh. The closing member 5 made of such butadiene rubber is capable of expansion to about 300 times as large in volume when heated to 200° C.

The sealing member 6 comprises a disc provided centrally with a circular hole 6A coinciding with the axial passage 5A of the closing member 5. The disc has an outside diameter which is substantially equal to the outside diameter L of the large diameter portion 3 at its free end 3A. The sealing member 6 is formed from heat resistant rubbery material. The cover 7 comprises a dish-shaped covering portion 7A placed about the outer periphery of the large diameter portion 3 at its free end 3A, and a tubular extension 8 of reduced diameter coaxially projecting from the virtually closed end of the covering portion 7A to serve as a pipe connector. The covering portion 7A is internally threaded at 7C for threaded connection with the externally threaded portion 3B of the tubular body 2. The small diameter portion 4 of the tubular body 2 is externally threaded at its free end as shown at 4A for threaded connection with a given metallic gas pipe 10. Likewise, the tubular extension 8 of the cover 7 is externally threaded at its free end as shown at 8A for threaded connection with another metallic gas pipe 9.

The gas pipe joint 1 of the foregoing construction may be easily assembled by inserting the closing member 5 into the large diameter portion 3 of the tubular body 2, placing the sealing member 6 against the free end 3A of the large diameter portion 3 and tightening the covering portion 7A of the cover 7 over the free end 3A of the large diameter portion 3 to secure the sealing member 6 in position. The gas pipe joint 1 thus constructed may be easily placed in use for connecting a pair of ordinary metallic gas pipes 9 and 10 in a usual manner as already described and shown in FIG. 2 to permit flow of gas between the gas pipes 9 and 10.

Figure 4:
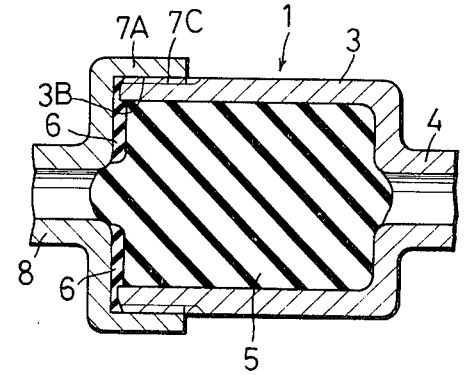
FIG. 4 is a view similar to FIG. 3 showing the closing member in its fully expanded position totally closing the axial passage of the joint.

If the gas pipe joint 1 is heated to a predetermined temperature of 200° C. or higher due to a fire or for any other cause, the closing member 5 begins to expand by resisting the pressure of the gas existing within the axial passage 5A (FIG. 3) until the closing member 5 totally closes the axial passage 5A thereof and the central hole 6A of the sealing member 6 (FIG. 4). Carbonization of the closing member 5 takes place to form it into a solid mass to thereby shut off any flow of gas through the gas pipe joint 1 and prevent any possible escape of gas that might otherwise happen.

Tests have been conducted to ascertain the effectiveness of the gas pipe joint 1 in shutting off escape of gas. The gas pipe joint 1 is directly heated by firing a gas burner and when heated for one minute and fifty seconds, the interior surface of the joint acquires a temperature of 200° C. With the elapse of three minutes after the test heating of the gas pipe joint 1 is started, the closing member 5 undergoes expansion totally closing its axial passage 5A and the central hole 6A of the sealing member 6.

Any gas pipe joint of this invention having its axial passage closed as described is removed from a gas line in a usual manner and changed to a new one having an open axial passage.

Figure 5:
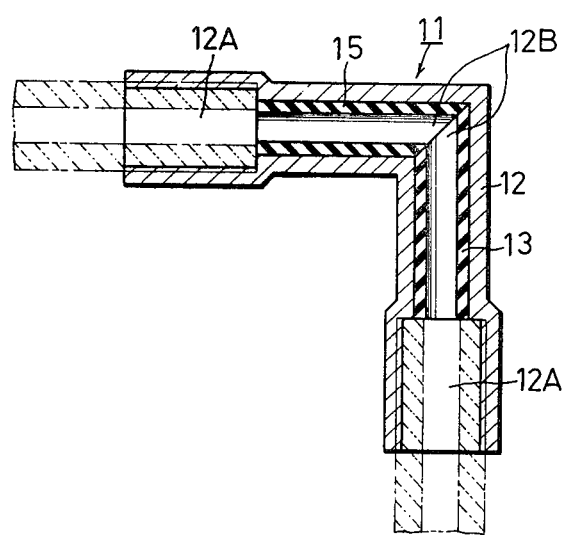
FIG. 5 is a longitudinal sectional view of a modified gas pipe joint of the L-shaped construction according to this invention.

FIG. 5 illustrates a modified form of the gas pipe joint embodying this invention. The gas pipe joint 11 of the L-shaped construction shown in FIG. 5 comprises an L-shaped metallic tubular body 12 having a pair of mutually perpendicular axial bores 12A, and a pair of tubular closing members 15 fitted within the respective axial bores 12A of the tubular body 12. Each of the closing members 15 has one end 12B inclined at an angle of about 45° relative to the longitudinal axis of the closing member 15. The ends 12B of the closing members 15 are so formed as to be complementary to each other as shown in FIG. 5. The securing of the closing members 15 within the tubular body 12 may be effected by an appropriate adhesive applied to the outer surfaces of the closing members 15.

Another modification of the gas pipe joint embodying this invention is shown in FIG. 6. This modified gas pipe joint is of the T-shaped construction and is generally indicated as 21 in FIG. 6. The gas pipe joint 21 comprises a T-shaped metallic tubular body 22 having a horizontal axial bore 22A and a vertical axial bore 22B joining the horizontal axial bore 22A perpendicularly thereto and opening into the horizontal axial bore 22A in the mid-portion thereof. A tubular closing member 25 of thermally expansible material is received within the horizontal axial bore 22A and is formed in its mid-portion with a circular hole 25A having a beveled edge. The vertical bore 22B holds another tubular closing member 26 of thermally expansible material having a beveled end 26A which complementarily contacts the beveled edge of the hole 25A of the horizontal closing member 25.

The various forms of gas pipe joints as hereinabove described may be produced by inserting a preformed tubular closing member or members of cured rubber into the axial bore or bores of a tubular body. Alternatively, a tubular shape of raw rubber containing a curing agent may be inserted movably into the axial bore of a tubular body prior to curing. Then, one end of the tubular body is closed by an appropriate stopper and air is forced into the axial bore of the tubular rubber material through the open end of the tubular body to form a tubular member of rubber having a predetermined wall thickness and adhering to the interior surface of the tubular body under the pressure of the air. Then, the rubber is cured and formed into a closing member in any desired gas pipe joint embodying this invention.

Attention is now directed to FIGS. 7 to 12 of the drawings and detailed description will be made of a preferred form of the self-closing gas pipe embodying this invention. The gas pipe 51 comprises a tube 52 of chloroprene rubber (a polymer of chloroprene) containing about 20% of chlorine. The tube 52 has an axial passage 53 for gas therethrough. The tube 52 is surrounded by a cylindrical reinforcing member 54 formed by interwoven glass fiber. According to this preferred embodiment, the tube 52 of chloroprene rubber has a wall thickness of 3.6 mm, its axial passage 53 has a diameter of 9.4 mm and the reinforcing member 54 has a wall thickness of 0.5 mm. The gas pipe 51 is as flexible as any conventionally available gas pipe.

Reference is now made to FIG. 8 diagrammatically illustrating the apparatus used in the tests conducted to ascertain the effectiveness of the gas pipe 51 of this invention. The apparatus includes a gas burner 56 mounted on a base G and connected to a gas container 55 by a conduit 58. The gas pipe 51 of this invention is horizontally supported above the gas burner 56 in an appropriate position where the flame of the burner 56 directly hits the gas pipe 51. A pilot burner 57 which indicates the continuity of gas flow through the gas pipe 51 under normal condition is connected to one end (the outlet end) of the gas pipe 51 by a conduit 59. The other (inlet) end of the gas pipe 51 is connected to the gas container 55 by a conduit 60. The apparatus further includes a pair of valves 58A and 60A provided on the conduits 58 and 60, respectively.

Using the apparatus described above, the test is conducted by first opening the valve 60A on the conduit 60 to supply combustible gas to the pilot burner 57 to ignite it. Then, the valve 58A on the conduit 58 is opened to ignite the test burner 56 to heat a portion 51A of the gas pipe 51. Combustible gas is supplied to the burners at a pressure of 120 mmAg and burnt at the rate of 0.2 m$^3$/h. The test is conducted to observe any change taking place on the heated portion 51A of the gas pipe 51 and the flame of the pilot burner 57. The fire on the pilot burner 57 went out two minutes after ignition of the test burner 56. The heating of the gas pipe 51 by the test burner 56 was continued for a further period of five minutes; in other words, the gas pipe 51 was heated for a total of seven minutes. As the result, the heated portion 51A of the gas pipe 51 was enlarged in outside diameter along a length of about 6 cm. Compare the outside diameters of the gas pipe 51 at the sectional lines X—X, XI—XI and XII—XII in FIG. 9. FIG. 10 shows that portion of the gas pipe 51 which was not exposed to the flame of the test burner 56. FIG. 11 shows one end of the heated portion 51A. That portion of the tube 52 which was enclosed in the heated portion 51A of the gas pipe 51 was carbonized into carbide having numerous separate bubbles. The heated portion 51A was cut for observation of its cross-sectional changes in a number of portions. The axial passage 53 of the gas pipe 51 was found considerably reduced in diameter at the ends of the heated portion 51A as shown in FIGS. 9 and 11. The axial passage 53 was completely closed in the midportion of the heated portion 51A as shown in FIGS. 9 and 12. The heated portion 51A did not catch fire, nor was it broken, even if it was continuously heated for half an hour or longer. Such a prolonged exposure to heat did not give rise to any appreciable change in the expansion of the heated portion 51A, either.

As the results of the test shows, the gas pipe 51 of this invention is very satisfactory in its self-closing characteristic. But in order that the gas pipe of this invention may be suitable for practical use, it must be sufficiently strong and durable. Accordingly, the table which will appear below shows the results of the tests conducted to ascertain the physical properties required for the practical acceptability of the gas pipe of this invention, as compared with those known in the art. The prior art pipe used for comparison comprises a tube of chloroprene rubber containing 15% to 17% of chlorine and does not have any reinforcing member surrounding the rubber tube. The wall thickness of the rubber tube and the diameter of its axial passage are identical to those of the gas pipe of this invention as hereinbefore described. The tests were conducted in accordance with the rules of K-6301 and K-6348 of JIS (Japanese Industrial Standards).

Physical Properties of the Gas Pipe Embodying This Invention Compared with the Prior Art

| | Invention | Prior Art |
|---|---|---|
| (1) Tensile tests Normal | | |
| Tensile strength (kg/cm$^2$) | 143 | 146 |
| Elongation (%) | 410 | 500 |
| Hardness (Hs) | 65 | 60 |
| Permanent elongation (%) | 10 | 9 |
| Aged at 70° C. for 96 hours | | |
| Change in tensile strength (%) | +2 | +9.1 |
| Change in elongation (%) | −17 | −9.3 |
| Change in hardness (Hs) | +8 | +8 |
| (2) Permeability to gases (ml/h) | nearly 0 | 2 |
| (3) Resistivity to gases | | |
| Change in volume (%) after exposure to n-butane at 0.2 kg/cm$^2$, 35° C. ± 2° C. for 72 hours | −1.5 | +5.0 |
| (4) Resistance to ozone at 50 ± 5 pphm, 40° C. ± 1° C., 72 hours, 30% elongation | No deterioration. | No deterioration. |
| (5) pressure test conducted by placing a weight of 20 kg on the pipe through which air under pressure of 280 mmAq. flows at the rate of 0.28 m$^3$/h. | No influence on air flow. | No influence on air flow. |

It will be obvious from the data shown in the foregoing table that the gas pipe of this invention possesses the physical properties, such as flexibility and tensile strength, required of a gas pipe for use with ordinary gas fired appliances. Therefore, if the gas pipe of this invention is used for connection between a source of domestic gas supply and a gas oven, for example, it will provide excellent safety in the event of a fire in its vicinity, for by virtue of expansion and carbonization of its rubbery material, the gas pipe automatically closes its axial passage to shut off escape of gas.

Instead of glass fiber, other noninflammable material, such as metal fiber or wire, may be used to cover the rubber tube of the gas pipe 51. For instance, heat resistant metal wire may be closely wound about the entire outer peripheral surface of a rubber tube formed from chloroprene rubber containing 20% of a halide.

The chloroprene rubber which is used to form the rubber tube 52 may contain about 18% to 40%, preferably not less than 20%, of a halide. Instead of such chloroprene rubber, it is equally possible to use chlorosulfonated polyethylene containing about 18% to 40%, preferably not less than 20%, of a halide, for instance, what is known under the Du Pont trade name "Hypalon". These rubbers expand to close the axial passage of the gas pipe when heated to a temperature of about 180° C. to 260° C.

The rubbery material suited for the manufacture of the gas pipe and the closing member of the gas pipe joint in accordance with this invention is one which is capable of expansion, carbonization and solidification when heated to certain temperatures and which is virtually noninflammable. Some preferred examples of such material have already been shown. Other examples of such material include chloroprene rubber containing about 18% to 40% of a halide, such as chlorine, and chlorosulfonated polyethylene containing a halide, particularly known under the Du Pont trade name "Hypalon". All of these materials are capable of expansion to about ten to several hundred times as large in volume when heated to temperatures of about 180° C. to 260° C., followed by carbonization and solidification. Among others, a preferred example of such rubbery material is rubber (for instance, butadiene rubber as already mentioned) containing thermally expansible graphite. Such rubber containing thermally expansible graphite is capable of expansion to about 500 times as large in volume when heated, followed by carbonization and solidification.

Description will now be directed to the method of this invention in which rubber containing graphite is, by way of example, used. The method of this invention comprises mixing 2 to 30 parts by weight of thermally expansible graphite with 100 parts by weight of natural or synthetic rubber, adding appropriate quantities of a reinforcing agent, a curing agent and a cure accelerator to the mixture of rubber and graphite and forming the mixture into a tubular shape. Carbon black or acetylene black is also added to rubber if desired. The thermally expansible graphite may be prepared by oxidizing graphite powder, washing it in water and drying it. Examples of such a reinforcing agent include magnesium carbonate and potassium carbonate. Examples of the curing agent include sulfur and 2-mercaptoimidazoline. Dibenzothiazyldisulfide is an example of the cure accelerator which may be used.

The graphite to be mixed with rubber may be either natural graphite, pyrolytic graphite or kish graphite preferably having a purity of not less than 70% and in the form of powder having a grain size of 5 to 300 mesh. Coarser powder having a grain size of less than 5 mesh is difficult to oxidize sufficiently. Finer powder having a grain size of more than 300 mesh fails to produce thermally expansible graphite which, when heated, can satisfactorily expand and close the axial passage of a gas pipe or joint by overcoming the pressure of gas flowing through the axial passage. The thermally expansible graphite prepared from raw graphite having a purity of less than 70% and containing a lot of ash and other foreign matter tends to produce rubbery material having poorer strength and flexibility and which fails to provide the desired self-closing characteristic when heated.

According to the method of this invention, graphite powder is oxidized by contacting it with fuming nitric acid at 20° C. to 30° C. for a half hour to an hour. Alternatively, oxidization is effected by contacting grahite powder with a mixture of a strong oxidizing agent, such as concentrated nitric acid, perchloric acid, potassium permanganate and chromate, and concentrated sulfuric acid at a temperature of 20° C. to 30° C. for a period of half an hour to an hour. The strong oxidizing agent should be anhydrous. The graphite so oxidized is washed in water and dried to form the thermally expansible graphite which is required. Two to 30 parts by weight of such thermally expansible graphite is mixed with 100 parts by weight of raw rubber; sulfur and a cure accelerator are added; and the material is formed into a tubular shape.

The thermally expansible graphite is preferably capable of expansion to 10 to five hundred times as large in volume between the graphite layers when heated. If it has an expansibility of less than 10 times, the gas pipe or joint made of such material fails to close its axial passage completely because of incomplete expansion. On the other hand, however, if the material expands to more than five hundred times, the rubber tube must be covered with extremely strong noninflammable material. This is not practical from an economical standpoint. Thus, it is preferable in practice to produce tube material which is capable of expansion to one hundred to five hundred times as large in volume when heated.

Use of less than two parts by weight of thermally expansible graphite fails to form a duly expansible tube having a satisfactory self-closing ability. Use of more than 30 parts by weight of thermally expansible graphite is not only unnecessary, but must be avoided in the preparation of tubular material for a gas pipe, because such a gas pipe requires an extremely strong noninflammable material covering the tubular metrial. In the preparation of tubular material for a gas pipe according to this invention, it is preferable to mix five to 20 parts by weight of thermally expansible graphite with 100 parts by weight of raw rubber. The tube material thus prepared contains about 3% to 11% by weight of thermally expansible graphite. Use of more than 30 parts by weight of thermally expansible graphite is not detrimental to the preparation of tube material for a gas pipe joint according to this invention, but it is not necessary at all to use such a large amount of thermally expansible graphite to fulfil the object of this invention.

While the invention has been described with reference to the preferred embodiments thereof, it is to be understood that further modifications or variations may be easily made by those skilled in the art without departing from the spirit and scope of this invention as defined by the appended claims.

What is claimed is:

1. A self-closing joint for connecting at least a pair of metallic gas pipes, said joint comprising:
   a metallic tubular member having an axial passage for gas and having means for connection with said gas pipes; and
   means provided within said metallic tubular member and adapted to close said axial passage upon expansion by heat, said means being formed from material which expands and carbonizes when heated, comprising a rubbery material containing thermally expansible graphite, and
   wherein said rubbery material containing thermally expansible graphite comprises about 2 to 30 parts by weight of oxidized thermally expansible graphite powder mixed with 100 parts by weight of raw rubber.

2. A self-closing gas pipe comprising:
   a tubular member having an axial passage for gas and formed from material which is, when heated, capable of expansion and carbonization to close said axial passage, comprising a rubbery material containing thermally expansible graphite; and
   a cylindrical member of noninflammable material surrounding said tubular member; and
   wherein said rubbery material containing thermally expansible graphite comprises about 2 to 30 parts by weight of oxidized thermally expansible graphite powder mixed with 100 parts by weight of raw rubber.

3. A gas pipe as defined in claim 2, wherein said cylindrical member is an interwoven structure of metal wire.

4. A gas pipe as defined in claim 2 wherein said cylindrical member is an interwoven structure of glass fiber.

* * * * *

UNITED STATES PATENT AND TRADEMARK OFFICE
CERTIFICATE OF CORRECTION

PATENT NO.    : 4,267,853
DATED         : May 19, 1981
INVENTOR(S)   : Yukio Yamaguchi et al It is certified that error appears in the above-identified patent and that said Letters Patent are hereby corrected as shown below:

On the title page, at section [73], the word "Daisha", in the first assignee's name, should read --Kaisha--.

Signed and Sealed this

Second Day of March 1982

[SEAL]

Attest:

GERALD J. MOSSINGHOFF

Attesting Officer

Commissioner of Patents and Trademarks